United States Patent [19]

Simmons

[11] Patent Number: 4,943,094

[45] Date of Patent: Jul. 24, 1990

[54] THREADED PIN AND BOX CONSTRUCTION FOR COMPOSITE TUBULARS

[75] Inventor: Pat Simmons, Mineral Wells, Tex.

[73] Assignee: Centron Corporation, Mineral Wells, Tex.

[21] Appl. No.: 251,679

[22] Filed: Sep. 30, 1988

[51] Int. Cl.$^5$ ............................................. F16L 25/00
[52] U.S. Cl. ................................. 285/333; 285/423; 403/307; 403/13
[58] Field of Search ............... 285/333, 334, 332.3, 285/332.2, 355, 390, 423; 403/343, 13, 288, 307; 411/369, 542, 907

[56] References Cited

U.S. PATENT DOCUMENTS

| | | | |
|---|---|---|---|
| Re. 31,123 | 1/1983 | Simmons | 285/334 |
| 1,932,427 | 10/1933 | Stone | 403/343 |
| 2,909,380 | 10/1959 | Hoye et al. | 285/333 |
| 3,784,239 | 1/1974 | Carter | 285/293 |
| 4,004,832 | 1/1977 | Connelly | 285/417 |
| 4,113,290 | 9/1978 | Miida | 285/355 |
| 4,154,466 | 5/1979 | Simmons | 285/334 |
| 4,191,486 | 3/1980 | Pelton | 403/343 |
| 4,332,502 | 6/1982 | Wormald et al. | 403/343 |
| 4,384,737 | 5/1983 | Reusser | 285/334 |
| 4,570,982 | 2/1986 | Blose et al. | 285/355 |
| 4,623,173 | 11/1986 | Handa et al. | 285/334 |
| 4,706,997 | 11/1987 | Carstensen | 285/333 |

OTHER PUBLICATIONS

Koch Fiberglass Products Sales Literature, Specification Sheet for Pipe Threads.

*Primary Examiner*—Dave W. Arola
*Assistant Examiner*—Carol I. Bordas
*Attorney, Agent, or Firm*—John F. Booth; Gerald G. Crutsinger; Norman L. Gundel

[57] ABSTRACT

A fiberglass pipe joint construction having threaded pin and box ends thereon. Tapered threaded portions are provided with profiles to improve alignment and sealing and prevent galling of the resinous material.

1 Claim, 1 Drawing Sheet

6
THREADED PIN AND BOX CONSTRUCTION FOR COMPOSITE TUBULARS

BACKGROUND OF THE INVENTION

This invention relates to threaded joints for tubulars and, more particularly, to an improved thread design which has particular advantages when used with pipe joints constructed from composite material such as fiberglass reinforced plastic (FRP). The invention is particularly adapted for use in a pin and box threaded joint type tubulars.

It is important and a great advantage that all equipment and tubulars used in and around oil wells be sufficiently durable to withstand rough handling and abuse. Tubulars should be capable of functioning in a dirty environment. Whether the tubulars are suspended in the well or used above ground, the tubulars should be rugged and resist damage. The nature of the materials being handled by oil field tubulars makes it important that the tubulars provide a reliable seal and do so under a variety of conditions and when exposed to rather high pressures. The tubulars should be designed such that during makeup (threading of adjacent sections together), the tubulars will not readily cross-thread because of misalignment.

Composite pipe joints should be designed so that when the joints are made up and torqued, damaging strains induced into the box and pin should be minimized to prevent laminate damage and cracking and damage to the threads in the pipe sections. In addition, the sections should be reusable, in that, a low breakout torque be required and thread galling be reduced to an acceptable level. In addition, the pipe should be designed so that it can be quickly made up and broken down to reduce the installation costs.

In the past, pipe joints constructed from metallic materials have had threads designed to correspond to the characteristics of these materials. However, thread designs for metallic tubulars function differently in fiberglass and can present significant disadvantageous when used in a fiberglass pipe joint.

In the past, fiberglass tubulars have been commonly joined with threaded connections. One of the standard connections is what is known in the industry as a "8RD EUE" threaded connection. Although these threaded joints have functioned for their intended purpose, they have not proved entirely satisfactory, in that, they have a tendency to cross-thread which can effectively destroy the threads in a joint. If the threading operation is slowed down to a rate where the possibility of cross-threading is substantially reduced, higher installation costs are experienced in the field. In addition, 8RD EUE threads induce strain in the box and pin due to makeup torque causing failures in the joint in some cases.

SUMMARY OF THE INVENTION

In accordance with the present invention, an improved thread design is provided which is particularly adapted for use in resinous tubulars such as fiberglass. The design provides an efficient seal under high internal pressure, is designed to reduce the possibility of cross-threading, has a thread cross-section which reduces strain in the box and pin induced by makeup torque, reduces breakout torque and galling and has a greater across the joint tensile strength.

BRIEF DESCRIPTION OF THE DRAWINGS

The details of the construction of the present invention and its advantages will be apparent from the description contained herein and the accompanying drawings in which.

DETAILED DESCRIPTION

Figure 1:
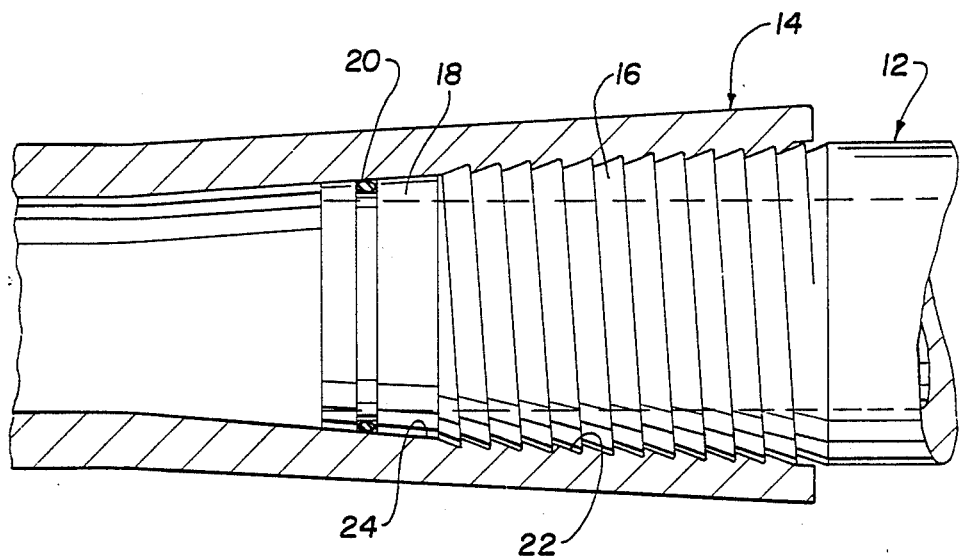
FIG. 1 illustrates a pipe joint with the box shown in section with the pin installed therein illustrating the improved thread design of the present invention.

Referring now to the drawings where in like reference characters are used in all of the figures to designate the same or like parts throughout, there is shown in FIG. 1, a pipe joint 10 utilizing the improved thread design of the present invention. A joint 10 consist of a pin end 12 and box end 14 shown in threaded engagement. As will be described in detail, the threads of the pin and box, 12 and 14 respectively, are tapered and are designed to engage to provide a rigid sealed pipe joint. Pin end 12 is provided with an externally threaded section 16, and a frusto conical stab aligning section 18. An O-ring groove and seal 20 is provided in the stab engaging surface 18. Box end 14 has a threaded portion 22 and stab aligning internal frusto conical shaped surface 24.

During makeup the pin and box are connected together as shown in FIG. 1. A thread lubricating compound is preferably placed on one or both of the threaded portions. The pin 12 is stabbed into the box 14 with the surface 18 being tapered to engage and be guided by the corresponding tapered surface 24. The engagement of these two surfaces 18 and 24 causes the pipe to be self-aligning, minimizing the possibility of cross-threading of the threads during makeup. In addition, the O-ring seal assembly 20 sealingly engages the surface 24 to provide a seal to prevent the thread compound from contaminating the interior of the pipe during makeup and provides a secondary seal. It is to be understood that the presence of the seal assembly 20 is optional.

Figure 2:
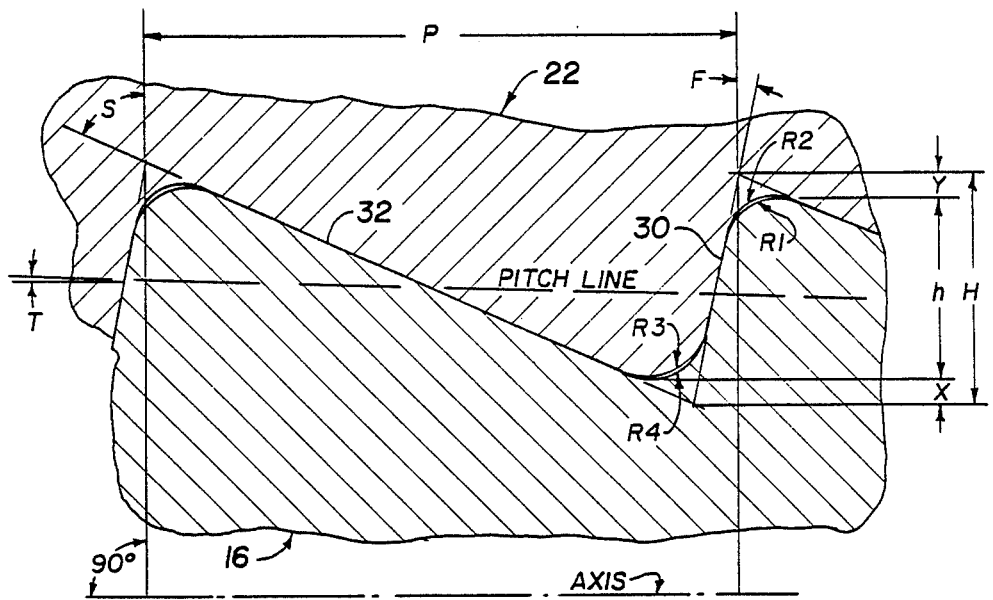
FIG. 2 is an enlarged sectional view of the geometry of the threads of the present invention.

Referring to FIG. 2, the details of the thread design are shown. The dimensions of the thread are as follows:
R = Varies with size of pipe
P = 0.250 inches
$R_1$ = 0.024 inches
$R_2$ = 0.020 inches
$R_3$ = 0.032 inches
$R_4$ = 0.028 inches
$R_1$-$R_4$ could be in the range from 0.020 to 0.032 inches
F = 7.5 degrees to 20 degrees, preferably 15 degrees
S = 66 degrees to 67 degrees
T = 1 degree to 1⅜ degrees
h = 0.075 inch
H = 0.098 inch
X = 0.012 inch
Y = 0.011 inch The pressure flank angle F is shown formed by a line in the plane of the face 30 of thread and a radial line. The flank angle is relatively close to perpendicular to the thread axis so that the radial component of the thread load is reduced to a minimum. This reduces hoop stress and prevents the thread, under tensile forces, from tending to jump or open a gap causing leakage.

The stab flank angle S is shown formed between a line in the plane of the back surface 32 of the thread and a radial line. The stab flank angle is relatively close to the thread axis and allows for a relatively low make-up torque to achieve a seal along its surface due to the high mechanical advantage that this low angle develops. This lower make-up torque also reduces the break-out torque.

The taper angle T of the threads is the angle of incline of the pitch line with respect to the center line of the tubular.

It has been found that by constructing threads according to the above, an improved composite pipe joint can be constructed.

It is to be understood that the foregoing discloses an embodiment of the present invention and that it is understood that alterations and modification from that shown can be made without departing from the spirit and scope of the invention defined by the claim.

What is claimed is:

1. An improved connector for nonmetallic resinous tubulars, fittings or the like comprising:
 a pin and box construction for threaded engagement with both the pin end and box end having a thread tapered in the range of 1 to 1⅜ degrees, a frusto conical shaped tapered guide surface positioned on the pin end adjacent the terminal end of said thread which cooperates with the box construction to align the threads of the pin end and box end in order to minimize the possibility of cross-threading, said thread having a pitch of 0.250 inch, a stab flank angle in the range of 66 degrees to 67 degrees, a pressure angle in the range of 7.5 degrees to 20 degrees and a thread height of 0.075 inch.

* * * * *